(12) United States Patent
Zhang et al.

(10) Patent No.: US 10,793,709 B2
(45) Date of Patent: Oct. 6, 2020

(54) POLYMER MIXTURE, MULTILAYER ARTICLE CONTAINING THE SAME, AND PROCESS OF PREPARING THE MULTILAYER ARTICLE

(71) Applicant: Dow Global Technologies LLC, Midland, MI (US)

(72) Inventors: Liang Zhang, Shanghai (CN); Jingui Jiang, Shanghai (CN); Yongchun Chen, Shanghai (CN); Yan Li, Shanghai (CN); Wei Li, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 387 days.

(21) Appl. No.: 15/027,329

(22) PCT Filed: Oct. 11, 2013

(86) PCT No.: PCT/CN2013/085024
§ 371 (c)(1),
(2) Date: Apr. 5, 2016

(87) PCT Pub. No.: WO2015/051526
PCT Pub. Date: Apr. 16, 2015

(65) Prior Publication Data
US 2016/0251507 A1    Sep. 1, 2016

(51) Int. Cl.
*C08L 33/06*  (2006.01)
*C09J 133/04*  (2006.01)
(Continued)

(52) U.S. Cl.
CPC .............. *C08L 33/06* (2013.01); *B05D 3/007* (2013.01); *B05D 7/50* (2013.01); *C04B 41/009* (2013.01); *C04B 41/48* (2013.01); *C04B 41/52* (2013.01); *C04B 41/71* (2013.01); *C08L 19/003* (2013.01); *C08L 23/16* (2013.01); *C08L 33/00* (2013.01); *C08L 33/08* (2013.01); *C08L 43/04* (2013.01); *C09J 133/04* (2013.01);
(Continued)

(58) Field of Classification Search
CPC ....... C04B 41/52; C04B 41/483; C04B 18/22; C08L 19/003; C08L 21/00; C08L 2312/08; C08L 33/08; E01C 13/045; E01C 13/065; E01C 13/04; E01C 13/06
USPC ...... 472/92; 52/403.1, 302.1; 404/28, 17, 82
See application file for complete search history.

(56) References Cited

U.S. PATENT DOCUMENTS 3,962,168 A    6/1976    Edwards
4,491,646 A    1/1985    Gruber et al.
(Continued)

FOREIGN PATENT DOCUMENTS

CN    101230158 A    7/2008
CN    101512080 A    8/2009
(Continued)

OTHER PUBLICATIONS

Bayer Material Science (Bayhydur® XP 2655, Product Datasheet). (Year: 2011).*

*Primary Examiner* — Alicia J Sawdon

(57) ABSTRACT

A novel polymer mixture having fast drying time, a multilayer article comprising at least two layers of the dried polymer mixture and having good mechanical properties, water resistance and weatherability, and a method of preparing the multilayer article.

10 Claims, 1 Drawing Sheet

(51) Int. Cl.
| | |
|---|---|
| *C08L 33/00* | (2006.01) |
| *C04B 41/48* | (2006.01) |
| *C04B 41/52* | (2006.01) |
| *C04B 41/00* | (2006.01) |
| *C04B 41/71* | (2006.01) |
| *E01C 13/06* | (2006.01) |
| *C08L 33/08* | (2006.01) |
| *C08L 43/04* | (2006.01) |
| *B05D 3/00* | (2006.01) |
| *B05D 7/00* | (2006.01) |
| *C08L 19/00* | (2006.01) |
| *C08L 23/16* | (2006.01) |
| *C08K 5/3492* | (2006.01) |
| *C08K 5/42* | (2006.01) |
| *C08K 5/5435* | (2006.01) |

(52) U.S. Cl.
CPC ........ *E01C 13/065* (2013.01); *C08K 5/34924* (2013.01); *C08K 5/42* (2013.01); *C08K 5/5435* (2013.01); *C08L 2312/08* (2013.01); *Y02W 30/96* (2015.05)

(56) References Cited

U.S. PATENT DOCUMENTS

| | | | |
|---|---|---|---|
| 8,258,240 B2 | 9/2012 | Suzuki et al. | |
| 2007/0225442 A1* | 9/2007 | Ootuka | C08F 2/22 525/100 |
| 2010/0099317 A1* | 4/2010 | Suzuki | C09J 7/38 442/149 |
| 2010/0125108 A1* | 5/2010 | Lau | C08C 1/14 521/41 |
| 2010/0279005 A1* | 11/2010 | Vaes | C08G 18/792 427/140 |
| 2011/0256395 A1* | 10/2011 | Zmarsly | C09J 133/08 428/354 |
| 2013/0011658 A1* | 1/2013 | Okamoto | B32B 27/08 428/317.3 |

FOREIGN PATENT DOCUMENTS

| | | |
|---|---|---|
| CN | 101597452 A | 12/2009 |
| CN | 101724366 A | 6/2010 |
| WO | 2006131138 A1 | 12/2006 |
| WO | 2009135104 A1 | 11/2009 |

\* cited by examiner

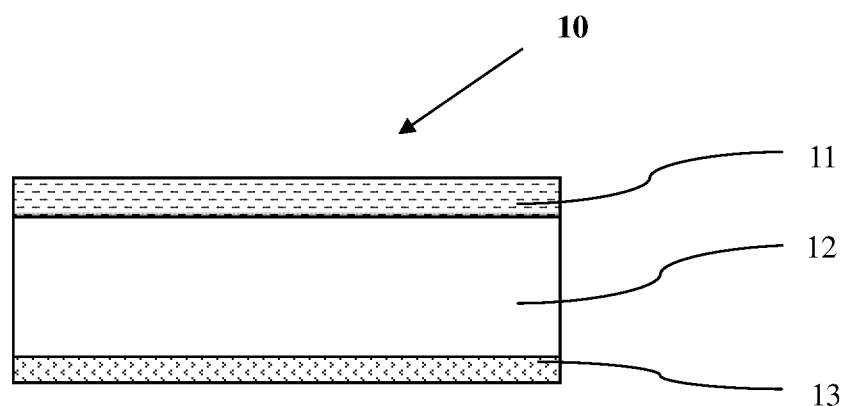

POLYMER MIXTURE, MULTILAYER ARTICLE CONTAINING THE SAME, AND PROCESS OF PREPARING THE MULTILAYER ARTICLE

FIELD OF THE INVENTION

The present invention relates to a polymer mixture and a multilayer article comprising at least two layers of the polymer mixture which has been dried, and a method of preparing the multilayer article.

INTRODUCTION

Synthetic sports track surfaces such as running track surfaces are typically made from a mixture of rubber and binder systems. Synthetic sports track surfaces in the market typically include water-permeable type and water-impermeable type. Among them, water-permeable sport track surfaces are widely used in rainy areas.

Sport track surfaces made from conventional two-component polyurethane binders are dominant in the market due to their satisfactory flexibility, wear-resistance, anti-slip property, and easy maintenance. These conventional two-component polyurethane binders usually comprise toluene diisocyanate or methylene diphenyl diisocyanate, organic solvents, and/or heavy metal-containing catalysts, which may be toxic or environmentally unfriendly.

Compared to conventional two-component polyurethane binders, acrylic latex binders have much less environmental concerns. Acrylic latex binders are typically used to prepare tennis court surfaces, which comprise multiple thin layers of acrylic binders, the thickness of each layer being typically less than 1 millimeter (mm). However, acrylic latex binders usually take too long to dry at room temperature (for example, 21 to 25° C.) when thickly applied, thus they are rarely used in applications such as in running tracks, whose surfaces typically have a thickness ≥13 mm. In addition, mechanical properties of running track surfaces using only acrylic latexes as binders may not be able to meet national and international requirements such as the GB/T 14833-2011 standard in China. Water-permeable running track surfaces are also required to have sufficient water resistance for outdoor use, particularly in rainy areas.

Therefore, it is desirable to provide a novel polymer mixture that dries faster at room temperature than conventional acrylic latex based compositions, and is suitable for preparing water-permeable running track surfaces that have sufficient water resistance and meet the standard requirements such as GB/T 14833-2011 standard.

SUMMARY OF THE INVENTION

The present invention provides a novel polymer mixture of at least two acrylic emulsion (co)polymers having different glass transition temperature, a crosslinking agent comprising a water-dispersible isocyanate composition, and vulcanized or crosslinked rubber. The polymer mixture of the present invention is substantially free of solvent and dries faster at room temperature than compositions comprising only conventional acrylic latex binders and rubber. A multilayer article comprising at least two layers made from the polymer mixture: (i) a base layer and (ii) a top layer. The multilayer article of the present invention shows better tensile properties even after immersing in water for 3 days than those of compositions containing no water-dispersible isocyanate composition and epoxy silane. A preferred multilayer article of the present invention meets the requirements of the GB/T 14833-2011 standard for water-permeable running track surfaces (item 4.1.4, page 2). The GB/T 14833-2011 standard herein is the national standard for synthetic materials track surfaces, which was published by General Administration of Quality Supervision, Inspection and Quarantine of the People's Republic of China (P. R. China) and Standardization Administration of the P. R. China, issued on Dec. 5, 2011, and put into effect on May 1, 2012.

In a first aspect, the present invention is a polymer mixture comprising an aqueous binder composition and vulcanized or crosslinked rubber, wherein the aqueous binder composition comprises:

(a) a first acrylic emulsion (co)polymer having a glass transition temperature ($T_g$) of −5° C. or less, (b) a second acrylic emulsion (co)polymer having a $T_g$ of at least 15° C., and (c) a crosslinking agent comprising a water-dispersible isocyanate composition;

wherein the vulcanized or crosslinked rubber has a sieve particle size of from 0.1 to 6 mm, and the weight ratio of total acrylic emulsion (co)polymers to the vulcanized or crosslinked rubber is from 1:12 to 1:1.

In a second aspect, the present invention is a multilayer article comprising at least two layers made from the polymer mixture of the first aspect:

(i) a base layer of dried polymer mixture, wherein the weight ratio of total acrylic emulsion (co)polymers to the vulcanized or crosslinked rubber in the base layer is from 1:6 to 1:12; and (ii) a top layer of dried polymer mixture, wherein the weight ratio of total acrylic emulsion (co)polymers to the vulcanized or crosslinked rubber is from 1:2 to 1:4.

In a third aspect, the present invention is a method of preparing the multilayer article of the second aspect. The method comprises:

(1) providing a first polymer mixture of the first aspect, wherein the weight ratio of total acrylic emulsion (co)polymers to the vulcanized or crosslinked rubber is from 1:6 to 1:12;

(2) applying the polymer mixture to a substrate;

(3) drying and curing the polymer mixture;

(4) providing a second polymer mixture of the first aspect, wherein the weight ratio of total acrylic emulsion (co)polymers to the vulcanized or crosslinked rubber is from 1:2 to 1:4;

(5) applying the second polymer mixture to the base layer; and (6) drying and curing the second polymer mixture to form a top layer, such that the base layer resides between the substrate and the top layer.

BRIEF DESCRIPTION OF THE DRAWINGS

FIG. 1 is a schematic illustration of a cross section of one embodiment of the present invention.

DETAILED DESCRIPTION OF THE INVENTION

The polymer mixture of the present invention comprises an aqueous binder composition and vulcanized or crosslinked rubber. The aqueous binder composition useful in the present invention may comprise: (a) a first acrylic emulsion (co)polymer having a $T_g$ of −5° C. or less, (b) a second acrylic emulsion (co)polymer having a $T_g$ of at least 15° C.

The value of $T_g$ in the present invention is calculated according to the Fox Equation (T. G. Fox, Bull. Am. Phys. Soc. 1, 123 (1956)). The term "aqueous" herein means water or a mixture of water with 50 wt % or less of water-miscible solvent, based on the weight of the mixture. The term "acrylic" herein refers to (meth)acrylic acid, (meth)alkyl acrylate, (meth)acrylamide, (meth)acrylonitrile and modified forms thereof, for example, (meth)hydroxyalkyl acrylate. The term "(meth)acrylic" refers to any of acrylic, methacrylic, and mixtures thereof.

The first or second acrylic emulsion (co)polymer useful in the present invention may comprise one or more copolymerized ethylenically unsaturated nonionic monomers. "Nonionic monomers" herein refer to polymerizable monomers that do not bear an ionic charge between pH=1-14. Examples of suitable ethylenically unsaturated nonionic monomers include (meth)acrylic ester monomers such as methyl acrylate, ethyl acrylate, butyl acrylate, 2-ethylhexyl acrylate, nonyl acrylate, decyl acrylate, lauryl acrylate, hydroxyethyl acrylate, hydroxypropyl acrylate, methyl methacrylate, ethyl methacrylate, butyl methacrylate, nonyl methacrylate, isodecyl methacrylate, lauryl methacrylate, hydroxyethyl methacrylate, 1, 3-butanediol dimethacrylate, and hydroxypropyl methacrylate; acrylamide; (meth)acrylonitrile; styrene and substituted styrene; or mixtures thereof. The ethylenically unsaturated nonionic monomers preferably comprise (meth)acrylic ester monomers, or their combination with styrene. In a preferred embodiment, the ethylenically unsaturated nonionic monomers comprise only (meth)acrylic ester monomers.

The first or second acrylic emulsion (co)polymer useful in the present invention may further comprise one or more copolymerized ethylenically unsaturated monomers having one or more functional groups. The functional groups may be selected from carbonyl, acetoacetate, alkoxysilane, carboxyl, ureido, amide, imide, amino group, or mixtures thereof. Preferably, an ethylenically unsaturated monomer bearing a carbonyl group such as diacetone acrylamide is used. Examples of suitable functional-group-containing ethylenically unsaturated monomers include ethylenically unsaturated carboxylic or dicarboxylic acids such as acrylic or methacrylic acid, itaconic acid, and maleic acid; amides, and preferably N-alkylolamides or hydroxyalkyl esters of the above-mentioned carboxylic acids, such as acrylamide, methacrylamide, N-methylolacrylamide, N-methylolmethacrylamide, 2-hydroxyethylacrylamide, 2-hydroxyethylmethacrylamide, hydroxyethyl acrylate, hydroxy ethyl methacrylate, hydroxypropyl acrylate and hydroxypropyl methacrylate; or mixtures thereof.

The first or second acrylic emulsion (co)polymer useful in the present invention may comprise, based on the weight of the first or second acrylic emulsion (co)polymer respectively, 0.01 weight percent (wt %) or more of the copolymerized functional-group-containing ethylenically unsaturated monomer, 0.05 wt % or more, or even 0.1 wt % or more, and at the same time, 20 wt % or less, 10 wt % or less, or even 5 wt % or less.

In a preferred embodiment, the first and second emulsion acrylic (co)polymers each comprises, based on the weight of the first or second acrylic emulsion (co)polymer respectively, from 70 to 99.5 wt % of the copolymerized ethylenically unsaturated nonionic monomer described above, and from 0.5 to 10 wt % of the copolymerized ethylenically unsaturated monomers having one or more functional groups described above.

The first or second acrylic emulsion (co)polymer useful in the present invention may further comprise one or more copolymerized surfactants. The surfactants preferably bear an allyl group. Suitable commercially available surfactants include, for example, TREM™ LF-40 surfactant based on sodium alkyl allyl sulfosuccinate available from Cognis, ADEKA™ Resoap SR-10 reactive anionic emulsifier available from Adeka, DEXTROL™ OC-1525 surfactant based on ammonium phosphate ester nonyl phenol ethoxylate available from Dexter, LATEMUL™ PD-104 anionic polymerizable surfactant available from Kao Chemicals, HITENOL™ KH-10 anionic polymerizable surfactant available from Dai-ichi Kogyo Seiyaku Co. Ltd, or mixtures thereof.

The first or second acrylic emulsion (co)polymer useful in the present invention may comprise, based on the weight of the first or second acrylic emulsion (co)polymer respectively, 0.01 wt % or more of the copolymerized surfactant, 0.3 wt % or more, or even 0.5 wt % or more, and at the same time, 10 wt % or less, 5 wt % or less, or even 2 wt % or less.

The first or second acrylic emulsion (co)polymer useful in the present invention may further comprise a chain transfer agent. Examples of suitable chain transfer agents include 3-mercaptopropionic acid, dodecyl mercaptan, methyl 3-mercaptopropionate, benzenethiol, azelaic alkyl mercaptan, or mixtures thereof. When present, the concentration of the chain transfer agent may be, based on the weight of the first or second acrylic emulsion (co)polymer respectively, from 0.01 to 20 wt %, from 0.1 to 10 wt %, from 0.2 to 2 wt %, or from 0.3 to 1 wt %.

The first or second acrylic emulsion (co)polymer useful in the present invention may be prepared by emulsion polymerization known in the art. The first or second acrylic emulsion (co)polymer useful in the present invention may be in the form of an emulsion. The emulsion may have solids from 30 to 70 wt %, from 35 to 68 wt %, or from 40 to 65 wt %, based on the total weight of the emulsion.

The first acrylic emulsion (co)polymer useful in the present invention may have a $T_g$ of $-5°$ C. or lower, $-6°$ C. or lower, $-8°$ C. or lower, or even $-10°$ C. or lower, and at the same time, $-50°$ C. or higher, $-45°$ C. or higher, or even $-40°$ C. or higher. Suitable commercially available first acrylic emulsion (co)polymer emulsions include, for example, ELASTENE™ 2848NG and RHOPLEX™ EC-2540 acrylic emulsions both available from The Dow Chemical Company (ELASTENE and RHOPLEX are trademarks of The Dow Chemical Company); or mixtures thereof.

The concentration of the first acrylic emulsion (co)polymer in the aqueous binder composition may be 5 wt % or more, 10 wt % or more, 15 wt % or more, or even 20 wt % or more, and at the same time, 95 wt % or less, 90 wt % or less, or even 80 wt % or less, based on the total weight of the acrylic emulsion (co)polymers in the aqueous binder composition.

The second acrylic emulsion (co)polymer may have a $T_g$ of at least $15°$ C., $18°$ C. or higher, or even $20°$ C. or higher, and at the same time, $60°$ C. or less, $50°$ C. or less, or even $40°$ C. or less. Suitable commercially available second acrylic emulsion (co)polymer emulsions include, for example, PRIMAL™ AC 261 P and PRIMAL TX-100 acrylic emulsions both available from The Dow Chemical Company (PRIMAL is a trademark of The Dow Chemical Company); or mixtures thereof.

The concentration of the second acrylic emulsion (co)polymer in the aqueous binder composition may be 5 wt % or more, 10 wt % or more, 15 wt % or more, or even 20 wt % or more, and at the same time, 95 wt % or less, 90 wt % or less, or even 80 wt % or less, based on the total weight of acrylic emulsion (co)polymers in the aqueous binder composition.

Total acrylic emulsion (co)polymers in the aqueous binder composition may be, based on the total weight of the aqueous binder composition, in an amount of 20 wt % or more, 30 wt % or more, or even 40 wt % or more, and at the same time, 70 wt % or less, 65 wt % or less, or even 60 wt % or less.

The aqueous binder composition useful in the present invention further comprises a crosslinking agent. "Crosslinking agent" herein refers to a compound that has two or more reactive groups and that is capable of reacting with reactive groups attached to polymer chains to form crosslinks between polymer chains. The reactive groups on the crosslinking agent may be the same as or different from the reactive groups attached to the polymer chains.

The crosslinking agent useful in the present invention comprises a water-dispersible isocyanate composition. The water-dispersible isocyanate composition useful in the present invention may comprise an isocyanate compound and a modified isocyanate compound comprising at least one anionic group, at least one polyethylene oxide segment, or both an anionic group and a polyethylene oxide segment. In some embodiments, the water-dispersible isocyanate composition comprises the isocyanate compound, a modified isocyanate compound comprising the anionic group, and a modified compound comprising the polyethylene oxide segment. As used herein, an anionic group is a chemical group that carries negative charge. The negative charge may be −1, −2, or −3. A compound with an anionic group is associated with one or more cations. The associated cation may be a metal cation or an organic compound with a cationic group, a group having a positive charge of +1, +2, or +3. When a compound with an anionic group is in solid form or is in a nonpolar environment, the associated cation(s) is located adjacent to the anionic group. When such a compound is dissolved or dispersed in water, the anionic group and the associated cation(s) may be separated. Preferred anionic group is sulphonate, carboxylate, carboxylic acid group, phosphonate, or a mixture thereof. Suitable commercially available water-dispersible isocyanate compositions include, for example, BAYHYDUR™ XP2655 hydrophilic aliphatic polyisocyanate based on hexamethylene diisocyanate available from Bayer Material Science AG.

Preferably, the isocyanate compound in the water-dispersible isocyanate composition is a polyisocyanate compound having two or more isocyanate (NCO) groups. The polyisocyanate compound maybe an aliphatic polyisocyanate, an aromatic polyisocyanate, or mixtures thereof. Examples of suitable aliphatic polyisocyanates are 1,6-hexamethylene diisocyanate (HDI), 1-isocyanato-3-isocyanatomethyl-3,5,5-trimethyl-cyclohexane (IPDI), 4,4'-diisocyanato dicyclohexylmethane ($H_{12}$MDI), di-isocyanatomethyl-cyclohexane (ADI), isomers thereof, polymers thereof, or mixtures thereof. The isocyanate compound is preferably an aromatic polyisocyanate. Examples of suitable aromatic polyisocyanates are toluylene-2,4-diisocyanate (2,4-TDI), toluylene-2,6-diisocyanate (2,6-TDI), naphthylene-1,5-diisocyanate, diphenylmethane-4,4'-diisocyanate (MDI), isomers thereof, polymers thereof, and mixtures thereof. Preferred polyisocyanate compounds comprise HDI trimer, polymeric MDI, or mixtures thereof. "Polymeric MDI" herein refers to a mixture of diphenylmethane diisocyanate, and its oligomer or polymer.

The concentration of the isocyanate compound in the water-dispersible isocyanate composition may be, based on total solids weight of the water-dispersible isocyanate composition, 1 wt % or more, 20 wt % or more, or even 50 wt % or more, and at the same time, 95 wt % or less, 90 wt % or less, or even 80 wt % or less.

In some embodiments, the modified isocyanate compound in the water-dispersible isocyanate composition may comprise one or more compounds having the structure of Formula (I):

$$A1-L1-(CH_2CH_2O)_n-Z \qquad \text{Formula (I)}$$

wherein A1 has the following structure:

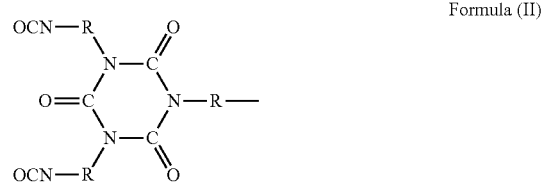

Formula (II)

L1 is a linking group formed by a reaction of an isocyanate group with an isocyanate-reactive group, n is 5 to 25, and Z is an alkyl group.

n may be 7 or more, or even 10 or more, and at the same time, 18 or less, or even 14 or less. Z may be linear, branched, cyclic, or a combination thereof. Z may be a linear or branched alkyl group having 1 to 8 carbon atoms, or 1 to 4 carbon atoms. Preferably, Z is methyl.

A1 is the residue of a diisocyanate trimer (a1). The diisocyanate trimer (a1) may be an aliphatic diisocyanate. Preferably, the diisocyanate trimer (a1) is HDI trimer, IPDI trimer, $H_{12}$MDI trimer, ADI trimer, or a mixture thereof. More preferably, the diisocyanate trimer (a1) is HDI trimer or ADI trimer.

L1 may be a urea group or a urethane group. Preferably, L1 is a urethane group. For example, when an isocyanate group reacts with a hydroxyl group or with an amine group, the resulting linking group L1 is a urethane group having the structure of Formula (III)-1 or a urea group having the structure of Formula (III)-2, respectively:

Formula (III)-1

Formula (III)-2 wherein $R^1$ is an organic group.

In some embodiments, the modified isocyanate compound in the water-dispersible isocyanate composition may comprise one or more compounds having the structure of Formula (IV):

$$A2-L2-Q-G \qquad \text{Formula (IV)}$$

wherein residue A2 may be identical or different with A1, and A2 has the structure of Formula (II) as described above; L2 is a linking group formed by a reaction of an isocyanate group with an isocyanate-reactive group; Q is an organic group; and G is an anionic group.

L2 may be a urea group or a urethane group. Preferably, L2 is a urea group having the structure of Formula (III)-2. More preferably, L2 is a urea group having the structure of Formula (III)-2 wherein $R^1$ is an unsubstituted alkyl group, preferably an alkyl group having 4 to 8 carbon atoms, and more preferably cyclohexyl. Q may be an alkyl group that is linear, branched, cyclic, or a combination thereof. Preferably, Q is a linear alkyl group. More preferably, Q is —$(CH_2)_n$— wherein n is 1 to 8, and preferably n is 3. G may be sulfonate, carboxylate, a carboxylic acid group, or phosphonate. Preferably, G is sulfonate.

In a preferred embodiment, the water-dispersible isocyanate composition useful in the present invention comprises a mixture of the modified isocyanate compounds of Formula (I) and Formula (IV). The weight ratio of the modified isocyanate compound of Formula (I) to the modified isocyanate compound of Formula (IV) may be 0.01:1 or more, 0.25:1 or more, 0.43:1 or more, or even 0.67:1 or more, and at the same time, 100:1 or less, 4:1 or less, 2.3:1 or less, or even 1.5:1 or less.

The water-dispersible isocyanate composition useful in the present invention may be prepared according to any known methods. The method of preparing the water-dispersible isocyanate composition may comprise reacting an isocyanate compound with an anionic compound and/or a non-ionic compound. Examples of suitable isocyanate compounds for preparing the water-dispersible isocyanate composition include those isocyanate compounds described above in the water-dispersible isocyanate composition. The anionic compound may comprise the anionic group described above. The non-ionic compound may comprise the polyethylene oxide segment described above. In a preferred embodiment, the water-dispersible isocyanate composition is prepared by reacting the non-ionic and/or anionic compound with a first isocyanate compound, then mixing the resultant modified isocyanate with a second isocyanate compound. The first isocyanate compound and the second isocyanate compound may be the same or different.

In a preferred embodiment, the crosslinking agent in the aqueous binder composition further comprises one or more epoxy silanes. Surprisingly, the combination of the epoxy silane and the water-dispersible isocyanate composition can further improve the water resistance property of the resultant cured polymer mixture. An epoxy silane means a functional silane having at least one epoxy group. A preferred epoxy silane has the structure of Formula (V):

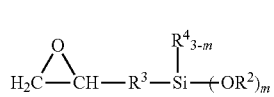

Formula (V)

wherein $R^2$ is an alkyl group having one to 6 carbon atoms; $R^3$ is a bivalent organic group having a molecular weight of 200 or less; $R^4$ is a hydrogen atom or an alkyl, aryl, or aralkyl group having one to 20 carbon atoms; and m is one, 2 or 3.

Examples of suitable epoxy silanes include 3-glycidoxypropyltrimethoxysilane; 3-glycidoxypropylmethyldiethoxysilane; 3-glycidoxypropyltriethoxysilane; beta-(3,4-epoxycyclohexyl)ethyltriethoxysilane; or mixtures thereof. Suitable commercially available epoxy silanes include, for example, SILQUEST™ A-187, SILQUEST WetLink 78, SILQUEST A-186, and COATOSIL™ 2287 epoxy silanes all available from Momentive Performance Materials; or mixtures thereof. When the epoxy silane is used, the weight ratio of the water-dispersible isocyanate composition to the epoxy silane may be 0.1:1 or more, 0.5:1 or more, or even 1.5:1 or more; and at the same time, 10:1 or less, 5:1 or less, or even 2.5:1 or less.

The concentration of total crosslinking agents in the aqueous binder composition may be, based on the total weight of acrylic emulsion (co)polymers, 1 wt % or more, 2 wt % or more, or even 3 wt % or more, and at the same time, 20 wt % or less, 15 wt % or less, or even 8 wt % or less.

The aqueous binder composition useful in the present invention may further comprise one or more defoamers. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, NOPCO™ NXZ metallic soap type defoamer, TEGO™ Airex 902 W and TEGO Foamex 1488 polyether siloxane copolymer emulsions both available from TEGO, BYK-024 silicone defoamer available from BYK, or mixtures thereof. When present, the concentration of the defoamer may be, based on the total weight of the aqueous binder composition, from 0.01 to 1 wt %, from 0.05 to 0.8 wt %, or from 0.1 to 0.3 wt %.

The aqueous binder composition useful in the present invention may further comprise one or more thickeners. The thickeners may be polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR, for example, ACRYSOL™ RM-8W nonionic rheology modifier available from The Dow Chemical Company (ACRYSOL is a trademark of The Dow Chemical Company). When present, the concentration of the thickener may be, based on the total weight of the aqueous binder composition, from 0.01 to 3 wt %, from 0.05 to 2 wt %, or from 0.1 to 0.3 wt %.

The aqueous binder composition useful in the present invention may further comprise water. The concentration of water may be, based on the total weight of the aqueous binder composition, from 10 to 90 wt %, from 20 to 80 wt %, or from 30 to 70 wt %.

In addition to the components described above, the aqueous binder composition useful in the present invention may further comprise any one or combination of the following additives: inorganic extenders, pigments, fillers, coalescing agents, cosolvents, buffers, neutralizers, dispersants, humectants, mildewcides, biocides, anti-skinning agents, colorants, flowing agents, anti-oxidants, plasticizers, leveling agents, dispersants, adhesion promoters, diluents and grind vehicles. When present, these additives may be in an amount of from 0.001 to 10 wt %, or from 0.01 to 2 wt %, based on the total weight of the aqueous binder composition.

The polymer mixture of the present invention further comprises vulcanized or crosslinked rubber. Examples of suitable vulcanized or crosslinked rubber useful in the present invention comprise styrene butadiene rubber (SBR), ethylene-propylene-diene monomer (EPDM) rubber, ethylene propylene rubber, butadiene rubber, natural rubber, styrene butadiene copolymer, hydrogenated nitrile, nitrile rubber, neoprene, polychloroprene, ground tire rubber (GTR), waste rubber, waste rubber vulcanizate, or mixtures thereof. Preferably, waste vulcanized or crosslinked rubber is used; such waste rubber may come from any known sources, such as, for example, tires, shoe soles, and ground tire rubber. More preferably, waste tire rubber is used.

The vulcanized or crosslinked rubber useful in the present invention may have a sieve particle size of 0.1 mm or more, 1 mm or more, or even 2 mm or more, and at the same time, 6 mm or less, 5 mm or less, or even 4 mm or less.

The weight ratio of total acrylic emulsion (co)polymers to the vulcanized or crosslinked rubber in the polymer mixture of the present invention may be from 1:12 to 1:1. The weight ratio may be 1:1.5 or lower, 1:2 or lower, and at the same time, 1:11 or higher, 1:10 or higher, 1:7 or higher, or even 1:6 or higher. When acrylic emulsion (co)polymer latexes are used, the weight ratio herein refers to the weight ratio of solids of the latexes to the vulcanized or crosslinked rubber.

The polymer mixture of the present invention may be obtained by firstly preparing the aqueous binder composition, and then mixing it with the vulcanized or crosslinked rubber. The aqueous binder composition may be supplied in two parts: the first and second acrylic emulsion (co)polymers, and optionally additional components such as the thickener and defoamer usually form "Part A"; and the crosslinking agent comprising the water-dispersible isocyanate composition usually forms "Part B". When used, the epoxy silane may be present in Part A and/or Part B. The polymer mixture of the present invention may be prepared by mixing Part A and Part B to form the aqueous binder composition, then mixing with the vulcanized or crosslinked rubber.

Surprisingly, the polymer mixture the present invention dries at room temperature much faster than a polymer mixture containing no water-dispersible isocyanate composition and epoxy silane. In one trial, an 8-12 mm thick layer of the polymer mixture was being dried for 3 hours at 25 to 28° C. The resultant layer is able to support a 50-kilogram weight person to walk on the layer.

The polymer mixture of the present invention may be cured at a temperature of generally from 5 to 80° C., from 10 to 50° C., from 15 to 40° C., or from 20 to 35° C. The time of curing the polymer mixture may be chosen between 30 minutes to 24 hours, between 1 hour to 20 hours, or between 2 hours to 10 hours. It is also operable to partially cure the polymer mixture and then complete the curing process at a later time.

The multilayer article of the present invention may comprise at least two layers made from the polymer mixture. The multilayer may comprise at least two layers of dried polymer mixture of the present invention: (i) a base layer of dried polymer mixture wherein the weight ratio of total acrylic emulsion (co)polymers to the vulcanized or crosslinked rubber is from 1:6 to 1:12, and (ii) a top layer of dried polymer mixture wherein the weight ratio of total acrylic emulsion (co)polymers to the vulcanized or crosslinked rubber is from 1:2 to 1:4.

In the base layer of the multilayer article of the present invention, the weight ratio of total acrylic emulsion (co)polymers to the vulcanized or crosslinked rubber may be 1:6.5 or lower, or even 1:7 or lower, and at the same time, 1:11 or higher, or even 1:10 or higher. The vulcanized or crosslinked rubber in the base layer may have a sieve particle size of from 1 to 6 mm, preferably from 2 to 5 mm, and more preferably from 3 to 4 mm. The vulcanized or crosslinked rubber in the base layer is preferably waste vulcanized or crosslinked rubber.

In the top layer of the multilayer article of the present invention, the weight ratio of total acrylic emulsion (co) polymers to the vulcanized or crosslinked rubber may be 1:2.5 or lower, and at the same time, 1:3.5 or higher, or even 1:3 or higher. The vulcanized or crosslinked rubber in the top layer may have a sieve particle size of from 0.1 to 6 mm, and preferably from 0.2 to 5 mm. The vulcanized or crosslinked rubber in the top layer is preferably EPDM rubber.

The multilayer article of the present invention may further comprise a primer layer, such that the base layer resides between the top layer and the primer layer. The primer layer may be used to further improve the adhesion of the multilayer article to a substrate. The primer layer may be made from an aqueous primer composition.

The aqueous primer composition useful in the present invention may comprise the first acrylic emulsion (co)polymer, the second acrylic emulsion (co)polymer, or mixtures thereof. The aqueous primer composition may further comprise the epoxy silane described above to further improve adhesion of the resultant multilayer article to a substrate under wet conditions. The aqueous primer composition may also comprise the water-dispersible isocyanate composition described above. In a preferred embodiment, the aqueous primer composition comprises the first and second acrylic emulsion (co)polymers, the epoxy silane, the water-dispersible isocyanate composition, and optionally the defoamer. Concentration of the above components in the aqueous primer composition may have the same ranges described above as they are in the aqueous binder composition.

The multilayer article of the present invention may further comprise other functional layers. For example, the multilayer article may further comprise a protective layer, so that the top layer resides between the protective layer and the base layer. The presence of the protective layer may be useful to further improve abrasion resistance and aging resistance of the multilayer article.

The multilayer article of the present invention may have a thickness of at least 10 mm, 12 mm or more, or even 13 mm or more. The volume ratio of the base layer to the multilayer article may be from 40 to 95%, from 50 to 90%, or from 70 to 80%, and the volume ratio of the top layer to the multilayer article may be from 5 to 60%, from 10 to 40%, or from 20 to 30%.

The multilayer article of the present invention has better mechanical strength, water resistance, and weatherability than a multilayer article made from a polymer mixture containing no water-dispersible isocyanate composition and epoxy silane. The multilayer article of the present invention achieves a tensile strength of at least 0.4 megapascal (MPa), and an elongation at break of at least 40%, according to the GB/T 14833-2011 standard. Preferably, the multilayer article also has the following properties: a force reduction of from 35 to 50%, a vertical deformation of from 0.6 to 2.5 mm, a slide resistance value of at least 47 British Pendulum Number ("BPN") (equivalent to a dynamic friction coefficient of 0.5) at 20° C., and a fire retardation grade of I, according to the GB/T 14833-2011 standard. In some embodiments, the multilayer article of the present invention after 3-day water immersion, or 14-day ultraviolet (UV)

exposure still achieves a tensile strength of at least 0.4 MPa, and an elongation at break of at least 40%, according to the GB/T 14833-2011 standard, which indicate that the multilayer article has good water-resistance and weatherability.

The method of preparing the multilayer article of the present invention may comprise:

(1) providing a first polymer mixture of the present invention wherein the weight ratio of total acrylic emulsion (co)polymers to the vulcanized or crosslinked rubber is from 1:6 to 1:12; (2) applying the first polymer mixture to a substrate; (3) drying and curing the first polymer mixture to form the base layer; (4) providing a second polymer mixture of the present invention wherein the weight ratio of total acrylic emulsion (co)polymers to the vulcanized or crosslinked rubber is from 1:2 to 1:4; (5) applying the second polymer mixture to the base layer; and (6) drying and curing the second polymer mixture to form the top layer, such that the base layer resides between the substrate and the top layer. The second polymer mixture preferably also comprises the defoamer, the thickener, the pigment described above, or mixtures thereof. More preferably, the second polymer mixture comprises the thickener.

In preparing the multilayer article, the first or second polymer mixture of the present invention can be applied to the substrate or to the base layer, respectively, by any known methods, for example, manual troweling or machine applying using conventional equipment such as TPJ-2.5 type synthetic running track paver. The obtained surface may be further smoothed by troweling. Preferably, the second polymer mixture is applied to the base layer by spraying. The substrate can be any substrate including, for example, concrete, bitumen, metal, or wood. Preferably, the substrate is primed by an aqueous primer composition described below before applying the first polymer mixture.

In preparing the multilayer article, drying and curing the first or second polymer mixture of the present invention may be carried out at a predetermined temperature and for a predetermined period of time sufficient to evaporate water. Drying and curing may be conducted at ambient temperature, for example, a temperature of from 5 to 50° C., from 15 to 40° C., or from 20 to 30° C. The time of drying and curing the polymer mixture may depend on various factors including, for example, thickness of the first or second polymer mixture applied to the substrate, and outdoor conditions such as temperature, relative humidity and wind. For example, the time for drying and curing the first or second polymer mixture may be chosen between 1 minute to 24 hours, between 5 minutes to 12 hours, between 20 minutes to 8 hours, or between 30 minutes to 6 hours. The method of preparing the multilayer article of the present invention can be conducted in a fairly short time due to the fast drying speed of the polymer mixture of the present invention. The time period between the application of the first polymer mixture to the substrate and the application of the second polymer mixture to the base layer may be various, for example, the time can be 8 hours or less, 6 hours or less, or even 5 hours or less, and at the same time, 2 hours or more, 2.5 hours or more, or even 3 hours or more.

The method of preparing the multilayer article of the present invention may further comprise: applying the aqueous primer composition to the substrate to form a primer layer before applying the polymer mixture to the substrate to form the base and the top layers.

The method of preparing the multilayer article is substantially free of solvent since little or no solvents were used in the process of making the multilayer article. The method can be conducted at a shorter time than a polymer mixture containing no water-dispersible isocyanate composition and epoxy silane.

The multilayer article of the present invention may be used in various applications, for example, sound proofing materials, acoustic underlayment, flooring underlayment and matting; industrial, sports utilities such as artificial track and playground surfaces, mats and pads, ball cores, and consumer products such as floor tiles, covers, molded products, and in road paving and maintenance applications. In particular, the multilayer article is suitable for use as water-permeable running track surfaces. "Water-permeable running track surfaces" herein refers to a synthetic track surface material made of rubber particles bonded by a resin binder and having have voids between rubber particles, that not only allows surface water runoff, but allows water to percolate through the surface material.

Specifically desirable embodiments of the present invention include a multilayer structure. With reference to FIG. 1, there is shown a schematic perspective view of one embodiment of a multilayer article of the present invention 10 comprising top layer 11, base layer 12, primer layer 13 and optionally one or more other layers therebetween. Each layer comprises two opposing primary surfaces. Top layer 11 contacts one primary surface of base layer 12 and primer layer 13 contacts the opposing primary surface of base layer 12, so that base layer 12 resides between top layer 11 and primer layer 13. An optional protective layer (not shown) may be applied on one primary surface of top layer 11, so that top layer 11 resides between the protective layer and base layer 12. Generally the thickness of the base layer may be 6 mm or more, 7 mm or more, or even 8 mm or more, and at the same time, 16 mm or less, 15 mm or less, or even 14 mm or less. The thickness of the top layer may be generally 1 mm or more, 1.5 mm or more, or even 2 mm or more, and at the same time, 5 mm or less, 4 mm or less, or even 3 mm or less. If present, the primer layer may generally have a thickness in the range of from 50 to 500 microns, from 75 to 400 microns, or from 100 to 300 microns.

EXAMPLES

Some embodiments of the invention will now be described in the following Examples, wherein all parts and percentages are by weight unless otherwise specified. The following materials and abbreviations are used in the examples:

"AA" stands for acrylic acid.

"MAA" stands for methacrylic acid.

"HEMA" stands for hydroxyethyl methacrylate.

"MATS" stands for mathacryloxy propyl tris-(trimethlsiloxy)silane.

"AM" stands for acrylamide.

"EHA" stands for 2-ethyl hexyl acrylate.

"BA" stands for butyl acrylate.

"MMA" stands for methyl meth-acrylate.

"BGDMA" stands for 1,3-butanediol dimethacrylate.

"AN" stands for acrylonitrile.

| | Acrylic Polymer Composition | $T_g$ | MFFT | pH value | Solids |
|---|---|---|---|---|---|
| Polymer 1A latex* | 1.4 AA/6.9 AN/86.3 BA/5.4 additives | −35° C. | <1° C. | 7.5 | 61% |
| Polymer 2A latex* | 45BA/52MMA/1MAA/2Ureido adhesion promoter | 24° C. | 18° C. | 9.5 (±0.5) | 50% |
| Polymer 1B latex* | 66.0 BA/0.8 MAA/33.1 MMA/0.1 additives | −10° C. | — | 9.5 (±0.3) | 55% |
| Polymer 2B latex* | 0.5AM/40.5 EHA/2.0 MAA/0.2 MATS/56.8MMA | 28° C. | 25° C. | 8 | 46.5% |

*Latexes are all available from The Dow Chemical Company.
$T_g$ is determined by the Fox Equation as described by Fox in Bulletin of the American Physical Society, 1, 123 (1956).
"MFFT" refers to Minimum Film Formation Temperature and is measured according to ASTM D2354-10.

NOPCO™ NXZ defoamer, available from Henkel, is a metallic soap type defoamer.

ACRYSOL RM-8W thickener is a nonionic urethane thickener and is available from The Dow Chemical Company.

ACRYSOL RM-2020NPR rheology modifier, available from The Dow Chemical Company, is a nonionic hydrophobically modified ethylene oxide urethane (HEUR) rheology modifier.

POLYOX™ WSR301 resin, available from The Dow Chemical Company, is a water soluble polyethylene oxide (PEO) resin and is used as a lubricant (POLYOX is a trademark of The Dow Chemical Company).

HTP433 is a self-prepared water-dispersible isocyanate composition according to the procedure described below and used as a crosslinking agent.

BAYHYDUR XP2655 water-dispersible polyisocyanate, available from Bayer Material Science AG, is a hydrophilic aliphatic polyisocyanate based on hexamethylene diisocyanate (HDI) and is used as a crosslinking agent.

SILQUEST A187 epoxy functional silane, available from Momentive Performance Materials Inc., is gamma-glycidoxypropyltrimethoxy silane and is used as a crosslinking agent.

COATOSIL 2287 epoxy functional silane, available from Momentive Performance Materials Inc., is 3-glycidoxypropylmethyldiethoxy silane and is used as a crosslinking agent.

Black waste tire rubber particles have a sieve particle size of 1-5 mm and are available from Shanghai Terra Engineering & Industry Co., Ltd.

EPDM rubber particles have a sieve particle size of 0.5-2 mm and are available from Guangzhou Chuanao Sports Facilities Co. Ltd.

OROTAN™ 731A dispersant is available from The Dow Chemical Company (OROTAN is a trademark of The Dow Chemical Company).

The following standard analytical equipment and methods are used in the Examples.

Force Reduction

Force reduction property of a running track sample is measured according to Appendix A, page 6, the GB/T 14833-2011 standard. If the sample has a force reduction is in the range from 35 to 50%, it meets the force reduction requirement of the GB/T 14833-2011 standard. Otherwise, it fails the force reduction requirement.

Vertical Deformation

Vertical deformation property of a running track sample is measured according to Appendix B, page 8, the GB/T 14833-2011 standard. If the sample shows a vertical deformation of from 0.6 to 2.5 mm, it meets the vertical deformation requirement of the GB/T 14833-2011 standard. Otherwise, it fails the vertical deformation requirement.

Slide Resistance

Slide resistance property of a running track sample is measured according to Appendix C, page 10, the GB/T 14833-2011 standard. If the sample shows a slide resistance value of at least 47 (BPN, 20° C.), it meets the slide resistance requirement of the GB/T 14833-2011 standard. Otherwise, it fails the slide resistance requirement.

Tensile Strength and Elongation at Break Properties

Tensile strength and elongation at break properties of a running track sample are evaluated according to item 5.4, page 3, the GB/T 14833-2011 standard. If the sample shows a tensile strength of at least 0.4 MPa, it meets the tensile strength requirement of the GB/T 14833-2011 standard. Otherwise, it fails the tensile strength requirement. If the sample shows an elongation at break of at least 40%, it meets the elongation at break requirement of the GB/T 14833-2011 standard. Otherwise, it fails the elongation at break requirement.

Tensile Adhesive Strength

The tensile adhesive strength of a primer composition to a concrete is measured according to item 6.14, page 4, the JG/T 24-2000 method—Sand textured building coating based on synthetic resin emulsion, which was published by the Ministry of Construction of the P. R. China, issued on May 10, 2000, and put into effect on Dec. 1, 2000. A tensile adhesive strength of at least 0.5 MPa is acceptable. The higher adhesive strength, the better adhesion of the primer composition to the concrete.

Fire Retardation

The fire retardation property of a running track sample is tested according to Appendix D, page 12 in the GB/T 14833-2011 standard. A fiber disc soaked with 2.5 mL alcohol is placed on the surface of the sample and is ignited. After the fiber disc's flame is extinguished, the diameter of char area on the surface of the sample is measured. If the diameter is smaller than or equal to 50 mm, the sample achieves Grade I fire retardation and meets the fire retardant requirement of the GB/T 14833-2011 standard. Otherwise, it fails the fire retardant requirement.

Particle Size

The particle size of an emulsion is measured by 90Plus™ particle size analyzer (Brookhaven Instruments).

Percent of Remaining NCO ("% Rem")

"% Rem" is measured as follows. First, "% NCO" is measured using a titration method. A sample containing isocyanate groups is reacted with a molar excess of dibutylamine (DBA) in a solution of toluene and dimethyl formamide (DMF). The excess DBA is then titrated to neutrality with a hydrochloric acid (HCl) solution. % NCO is then calculated from the weight of the sample and the amounts of DBA and HCl used as follows:

% NCO=100*42.02*(equivalents of DBA consumed)/(weight of the sample)

For a given sample, % NCO is measured as a function of time, and % Rem is calculated as follows:

% Rem=100*(% NCO after elapsed time)/(initial % NCO)

Insoluble Fraction of a Polymer Film

The insoluble fraction of a polymer film, that is cross-linking density, is measured as follows. A composition is coated on a glass substrate, then dried at room temperature for 12 hours and additionally at 80° C. for 24 hours to form a polymer film. The polymer film is then dissolved in tetrahydrofuran (THF) at room temperature. The insoluble fraction of the polymer film in THF, based on the total weight of the polymer film, is obtained.

Synthesis of HTP433 Isocyanate Crosslinking Agent (1) Preparation of Ethoxylated HDI Trimer DESMODUR™ N 3300 HDI trimer is available from Bayer Material Science AG. CARBOWAX™ methoxypolyethylene glycol (MPEG) 550 polymer, available from The Dow Chemical Company, has the structure $CH_3$—$(OCH_2CH_2)_n$—OH wherein n has the average value of 11.8 (CARBOWAX is a trademark of The Dow Chemical Company). HDI trimer was mixed with CARBOWAX MPEG 550 polymer to form a reaction mixture. The reaction mixture, prior to the reaction taking place, had a molar ratio of isocyanate groups to hydroxyl groups of 6:1. The reaction mixture was held at 100° C. for 5 hours. It is contemplated that the resultant reaction product (hereinafter "Ethoxylated HDI Trimer") included a compound having the following structure:

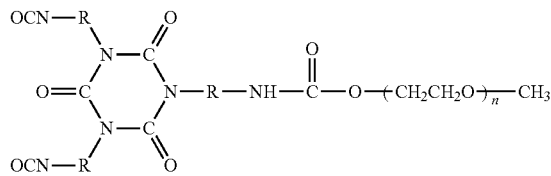

wherein R is —$(CH_2)_6$— and n has an average value of 11.8.

(2) Preparation of Anionic HDI Trimer

A reaction mixture was formed by mixing HDI trimer, 3-(cyclohexylamino)-1-propanesulfonic acid ("CAPS"), and N,N-dimethylcyclohexylamine ("DMCHA"). The mole ratio of CAPS to DMCHA was 1:1. The molar ratio of NCO in HDI trimer: NH in CAPS was 7:1. The reaction mixture was heated at 80° C. for 3 hours. The resultant reaction product (hereinafter "Anionic HDI trimer") comprised a compound having the following structure:

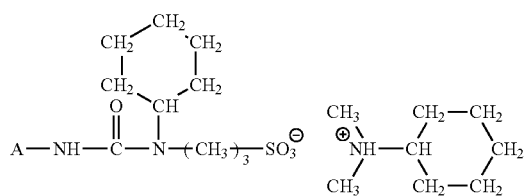

wherein A is the residue of HDI trimer.

(3) Preparation of HTP 433 Isocyanate Crosslinking Agent

The isocyanate crosslinking agent was prepared by mixing water, an emulsifier, the HDI trimer, and polymeric MDI. The polymeric MDI used was PAPI™ 135 polymeric MDI available from The Dow Chemical Company (PAPI is a trademark of The Dow Chemical Company). The emulsifier was a mixture of the Ethoxylated HDI Trimer and the Anionic HDI Trimer prepared above at a weight ratio of 1:1. The weight ratio of emulsifier/polymeric MDI/HDI trimer is 40/30/30. The combined amount of the polymeric MDI, the emulsifier, and the HDI trimer was 4 weight parts. The amount of water was 96 weight parts. The obtained isocyanate crosslinking agent showed a viscosity of 7580 millipascal.seconds (mPa*s), an average particle size of 163 nanometers (nm). The amount of NCO groups was measured as a percentage of the initial amount of NCO groups for each mixture. The remaining NCO (% Rem) after 8 hours of ambient storage was 70%.

The obtained HTP433 isocyanate crosslinking agent was added into a latex at room temperature to form compositions with different concentrations. The latex used is a mixture of Polymer 1A latex with Polymer 2A latex at a solids weight ratio of 1:1. These compositions were evaluated for the insoluble fraction of the resultant polymer films according to the test method described above. The insoluble fraction of the resultant polymer films in THF was 63 wt %, 72.5 wt %, 78.4 wt %, and 85.1 wt % for the composition containing 0 wt %, 2 wt %, 4 wt %, 8 wt % of HTP433, respectively. Weight percentage of the HTP433 concentration is based on solids weight of the latex. Weight percentage of the insoluble fraction is based on the total weight of the polymer film.

Example (Ex) 1

Binder-1 was prepared by mixing Part A and Part B based on formulations described in Table 1. Binder-1 was then mixed with waste tire rubber particles at a weight ratio of the binder to the tire rubber of 1:4. The resultant first polymer mixture was then casted onto a plastic film and was dried at room temperature for one day to form a base layer with a thickness of about 10-12 mm. Binder-2 was prepared by mixing Part A and Part B, then was mixed with EPDM rubber particles at a weight ratio of the binder to the EPDM rubber of 1:1.5. The resultant second polymer mixture was sprayed onto the base layer and formed a top layer with a thickness of about 3 mm. The resultant samples were exposed to dry condition (1 day at 23° C.+1 day at 70° C.+1 day at 23° C.), wet condition (1 day at 23° C.+1 day at 70° C.+1 day at 23° C.+3 days in water), or 14-day UV condition (1 day at 23° C.+1 day at 70° C.+3 days at 23° C.+14 days UV exposure), respectively, wherein the running track samples comprising the base layer and the top layer were peeled off from the plastic film before curing at 70° C. Properties of the resultant running track samples were then evaluated according to the test methods described above and were reported in Table 2.

Exs 2-5

Running track samples of Exs 2-5 were prepared according the same procedure described in Ex 1, based on binder compositions described in Table 1 and polymer mixture formulations described in Table 3. Properties of the resultant running track samples after exposing to different conditions were reported in Table 3.

As shown in Table 2, all properties of the running tack samples of Ex 1 under the dry condition met the requirements of the GB/T 14833-2011 standard. When exposing to the wet condition, the resultant running track samples still showed acceptable tensile strength and elongation at break properties, which indicate that the running track samples of Ex 1 has good water resistance. After an exposure of the 14 days UV condition, the resultant running track samples of Ex 1 still showed acceptable tensile strength and elongation at break properties, which indicate that these running track samples of Ex 1 has good weatherability. Optical microscope investigation on the running track samples showed that interlocking existed between the binder, and waste tire rubber or EPDM particles.

As shown in Table 3, all running track samples of Exs 2-5 also showed a tensile strength of at least 0.40 MPa and an elongation at break of at least 40%, thus, met the tensile strength and elongation at break requirements of the GB/T 14833-2011 standard.

TABLE 1

| | | Binder Composition, weight parts | | | | | | |
|---|---|---|---|---|---|---|---|---|
| | | Binder-1 | Binder-2 | Binder-3 | Binder-4 | Binder-5 | Binder-6 | Binder-7 |
| Part A | Polymer 1A latex | 63.27 | 63.27 | 63.27 | 63.27 | 30.17 | 50.17 | |
| | Polymer 2A latex | 31.63 | 31.63 | | | 68.05 | 48.05 | 25 |
| | Polymer 1B latex | | | | | | | 75 |
| | Polymer 2B latex | | | 31.63 | 31.63 | | | |
| | NOPCO NXZ | 0.20 | 0.20 | 0.20 | 0.20 | 1.78 | 1.78 | 0.2 |
| | ACRYSOL RM-8W | 0.15 | | 0.15 | | 0.15 | 0.15 | 0.15 |
| | POLYOX WSR301 | | 0.15 | | 0.15 | | | |
| Part B | BAYHYDUR XP2655E | 2.85 | 2.85 | 2.85 | 2.85 | | | 3 |
| | COATOSIL 2287 | 1.90 | 1.90 | 1.90 | 1.90 | | | 2 |
| | HTP433 | | | | | 8.56 | 8.56 | |

TABLE 2

| | Properties of running track samples of Ex 1 | GB/T 14833-2011 (Item 4.1.4, page 2) for water-permeable running tracks |
|---|---|---|
| Force reduction-dry condition, % | 36.1 | 35-50 |
| Vertical deformation-dry condition, mm | 1.42 | 0.6-2.5 |
| Slide resistance-dry condition (BPN, 20° C.) | 61 | ≥47 |
| Tensile strength-dry condition, MPa | 0.53 | ≥0.4 |
| Elongation at break-dry condition, % | 55.9 | ≥40 |
| Tensile Strength-wet condition, MPa | 0.54 | — |
| Elongation at break-wet condition, % | 54.4 | — |
| Tensile Strength-14 d UV condition, MPa | 0.63 | — |
| Elongation at break-14 d UV condition, % | 46.4 | — |
| Fire retardation grade | I | I |

*Dry condition: 1 day at 23° C. + 1 day at 70° C. + 1 day at 23° C.
Wet condition: 1 day at 23° C. + 1 day at 70° C. + 1 day at 23° C. + 3 days in water
14 d UV condition: 1 day at 23° C. + 1 day at 70° C. + 3 days at 23° C. + 14 days UV exposure

TABLE 3

| | Ex 2 | Ex 3 | Ex 4 | Ex 5 |
|---|---|---|---|---|
| First polymer mixture for base layer | Binder-3:waste tire rubber = 1:4 | Binder-5:waste tire rubber = 1:4 | Binder-6:waste tire rubber = 1:4 | Binder-7:waste tire rubber = 1:4 |
| Second polymer mixture for top layer | Binder-4:EPDM rubber = 1:1.5 | Binder-5:EPDM rubber = 1:1.5 | Binder-6:EPDM rubber = 1:1.5 | Binder-7:EPDM rubber = 1:1 |
| | | Properties of running track samples | | |
| Tensile Strength-dry condition, MPa | 0.57 | 0.46 | 0.47 | 0.64 |
| Elongation at break-dry condition, % | 44.1 | 52.0 | 62.7 | 40.7 |
| Tensile Strength-wet condition, MPa | 0.54 | — | — | 0.6 |
| Elongation at break-wet condition, % | 45.2 | — | — | 45 |

*Dry condition: 1 day at 23° C. + 1 day at 70° C. + 1 day at 23° C.
Wet condition: 1 day at 23° C. + 1 day at 70° C. + 1 day at 23° C. + 3 days in water

Ex 6-8

Job-Site Trials

Primer compositions were firstly prepared based on formulations described in Table 4. Tensile adhesive strength properties of these primers on a concrete substrate were measured according to the test method described above and were reported in Table 4. The adhesion strength of the primers to the concrete substrate is good both under wet and dry conditions.

TABLE 4

| Component, weight parts | Primer-1 | Primer-2 | Primer-3 | Primer-4 |
|---|---|---|---|---|
| Polymer 1A latex | 63.27 | 63.27 | | 47.30 |
| Polymer 2A latex | 31.63 | 31.63 | | 50.00 |
| Polymer 1B latex | | | 47.45 | |
| Polymer 2B latex | | | 47.45 | |
| NOPCO NXZ defoamer | 0.1 | 0.1 | 0.1 | 0.10 |
| SILQUEST A187 | | 2.00 | 2.00 | 2.00 |
| COATOSIL 2287 | 2.00 | | | |
| BAYHYDUR XP2655E | 3.00 | 3.00 | | |
| ACRYSOL RM-2020 NPR | | | | 0.30 |
| OROTAN 731A | | | | 0.30 |
| | Properties of the primers | | | |
| Tensile adhesive strength-dry condition, MPa | 2.6 | 2.5 | 3.2 | — |
| Tensile adhesive strength-wet condition, MPa | 2.5 | 2.3 | 2.0 | — |

*Dry condition: 1 day at 23° C. + 1 day at 70° C. + 1 day at 23° C.
Wet condition: 1 day at 23° C. + 1 day at 70° C. + 1 day at 23° C. + 3 days in water Running track samples of Exs 6-8 were prepared at the job site. Binder-7 and Binder-8 were prepared based on formulations described in Table 5, respectively. The Primer-2, Primer-3, and Primer-4 were diluted with water (weight ratio=1:1) and applied onto a concrete substrate, respectively. Then a binder and waste rubber tire particles were manually mixed to form a first polymer mixture, then were applied on the primed substrate and smoothed by trowelling. After 3 hours, the resultant base layer with a thickness of about 10-12 mm was fully dried and walkable. Then a binder was mixed with EPDM rubber particles. The resultant second polymer mixture was then sprayed onto the base layer to form a top layer with a thickness of about 3 mm. The resultant running track samples did not show delamination or surface damage after 6 months.

TABLE 5

| | Ex 6 | Ex 7 | Ex 8 |
|---|---|---|---|
| Binder composition | Binder-7, weight part | Binder-8, weight part | Binder-8, weight part |
| Polymer 1A latex | 50.17 | 50.17 | 50.17 |
| Polymer 2A latex | 48.05 | 48.05 | 48.05 |
| NOPCO NXZ | 1.78 | 1.78 | 1.78 |
| RM-8W | 0.15 | 0.15 | 0.15 |
| HTP433 | 6 | 0 | 0 |
| XP2655 | 0 | 6 | 6 |
| Primer Composition | Primer-4 | Primer-2 | Primer-3 |
| First polymer mixture for base layer | Binder-7:waste tire rubber = 1:4 | Binder-8:waste tire rubber = 1:4 | Binder-8:waste tire rubber = 1:4 |
| Second polymer mixture for top layer | Binder-7:EPDM rubber = 1:1.5 | Binder-8:EPDM rubber = 1:1.5 | Binder-8:EPDM rubber = 1:1.5 |

Exs 9-11 and Comparative (Comp) Ex A-D

Running track samples were prepared based on formulations described in Table 6. A first polymer mixture of a binder and black rubber tire particles at a weight ratio of the binder to the rubber tire of 1:4, and were cast into an open mold with a nonabsorbent substrate and a steel frame to form a base layer with a thickness of about 10-12 mm. After 1 day at room temperature, a second polymer mixture of the binder with EPDM rubber particles (weight ratio of binder: EPDM rubber=1:1.5) was applied to the base layer to form a top layer with a thickness of about 3 mm. The resultant samples were either directly evaluated for drying properties at room temperature, or further cured for mechanical testing, respectively:

(1) Drying properties: The base layers of the resultant samples of Comp Exs A-C were still wet and rubber particles in these base layers showed no cohesion. These running track samples could not be demoulded or cut into dumbbell shape samples.

In contrast, the running track samples of Exs 9-11 and Comp Ex D were able to be demoulded. The bottom surfaces of the base layers of Exs 9-11 and Comp Ex D, the surfaces that contacted the substrate, were dried. All these samples were able to be cut into dumbbell shape samples for testing, for example, the running track sample of Ex 10 achieved a tensile strength of 0.15 MPa and an elongation at break of 33.20%.

(2) Tensile properties: The resultant samples were exposed to the dry condition or the wet condition, respectively, wherein the samples were demoulded before curing at 70° C. For Comp Ex A, both dry and wet tensile strength could not achieve 0.40 MPa. For Comp Ex B, wet tensile strength could not reach 0.40 MPa. For Comp Ex C, both wet tensile strength and wet elongation at break were too low to be acceptable. The running track samples made from the binder only comprising hard polymer (Comp Ex D) achieved the required tensile strength, but failed to provide an elongation at break ≥40%, in particular, after immersing in water for 3 days.

In contrast, the running track samples of the present invention (Exs 9-11) under both dry and wet conditions achieved a tensile strength much higher than 0.4 MPa and an elongation at break much higher than 40%.

silane having at least one epoxy group and said epoxy silane having the structure of Formula (V):

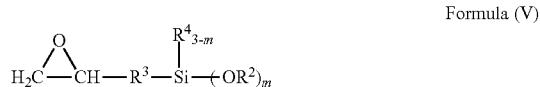

Formula (V)

wherein $R^2$ is an alkyl group having one to 6 carbon atoms; $R^3$ is a bivalent organic group having a molecular weight of 200 or less; $R^4$ is a hydrogen atom or an alkyl, aryl, or aralkyl group having one to 20 carbon atoms; and m is one, 2 or 3; and wherein the vulcanized or crosslinked rubber has a sieve particle size of from 0.1 to 6 mm, and the weight ratio of total acrylic emulsion (co)polymers to the vulcanized or crosslinked rubber is from 1:12 to 1:1;

wherein the synthetic sports surfaces has an elongation at break of at least 40%, according to the GB/T 14833-2011 standard.

2. The synthetic sports surface of claim 1, wherein the water-dispersible isocyanate composition comprises an isocyanate compound, a modified isocyanate compound having an anionic group, and a modified isocyanate compound having a polyethylene oxide segment.

3. The synthetic sports surface of claim 1, wherein the crosslinking agent is present in an amount of from 1 to 10 wt %, based on the total weight of the acrylic emulsion (co)polymers.

4. The synthetic sports surface of claim 1, wherein the aqueous binder composition comprises from 5 to 95 wt % of the first acrylic emulsion (co)polymer, and from 5 to 95 wt

TABLE 6

|  | Comp Ex A | Comp Ex B | Comp Ex C | Ex 9 | Ex 10 | Ex 11 | Comp Ex D |
|---|---|---|---|---|---|---|---|
| Binder compositions, weight parts | | | | | | | |
| Polymer 1A latex | 66.7 | 50.0 | 33.3 | 66.7 | 50.0 | 33.3 | — |
| Polymer 2A latex | 33.3 | 50.0 | 66.7 | 33.3 | 50.0 | 66.7 | 100.0 |
| NOPCO NXZ | 0.20 | 0.20 | 0.20 | 0.20 | 0.20 | 0.20 | 0.20 |
| ACRYSOL RM-8W | 0.15 | 0.15 | 0.15 | 0.15 | 0.15 | 0.15 | 0.15 |
| COATOSIL 2287 | — | — | — | 2.0 | 2.0 | 2.0 | 2.0 |
| BAYHYDUR XP2655 | — | — | — | 5.0 | 5.0 | 5.0 | 5.0 |
| Mechanical properties of running track samples | | | | | | | |
| Tensile Strength-dry condition, MPa | 0.35 | 0.49 | 0.48 | 0.71 | 0.72 | 0.81 | 0.78 |
| Elongation-dry condition, % | 53.12 | 54.62 | 40.88 | 58.51 | 54.95 | 52.73 | 39.24 |
| Tensile Strength-wet condition, MPa | 0.25 | 0.30 | 0.30 | 0.59 | 0.64 | 0.65 | 0.60 |
| Elongation-wet condition, % | 53.96 | 40.28 | 38.29 | 58.36 | 57.62 | 53.04 | 34.90 |

*Dry condition: 1 day at 23° C. + 1 day at 70° C. + 1 day at 23° C.
Wet condition: 1 day at 23° C. + 1 day at 70° C. + 1 day at 23° C. + 3 days in water

What is claimed is:

1. A synthetic sports surface comprising a polymer mixture, wherein the polymer mixture comprises an aqueous binder composition and vulcanized or crosslinked rubber, wherein the aqueous binder composition comprises:
    (a) a first acrylic emulsion (co)polymer having a glass transition temperature of −45° C. to −5° C.,
    (b) a second acrylic emulsion (co)polymer having a glass transition temperature of at least 15° C., and
    (c) a crosslinking agent comprising a water-dispersible isocyanate composition;
    wherein the crosslinking agent further comprises an epoxy silane, said epoxy silane being a functional % of the second acrylic emulsion (co)polymer, based on the total weight of the acrylic emulsion (co)polymers.

5. The synthetic sports surface of claim 1, wherein the first acrylic emulsion (co)polymer and the second acrylic emulsion (co)polymer each comprises as polymerized units, at least one ethylenically unsaturated nonionic monomer, and at least one ethylenically unsaturated monomer having at least one functional group selected from carbonyl, acetoacetate, alkoxysilane, carboxyl, ureido, amide, imide or amino group, or mixtures thereof.

6. A multilayer synthetic sports surface comprising at least two layers made from the polymer mixture of claim 1:

(i) a base layer of dried polymer mixture, wherein the weight ratio of total acrylic emulsion (co)polymers to the vulcanized or crosslinked rubber is from 1:6 to 1:12; and (ii) a top layer of dried polymer mixture, wherein the weight ratio of total acrylic emulsion (co)polymers to the vulcanized or crosslinked rubber is from 1:2 to 1:4.

7. The multilayer synthetic sports surface of claim 6, wherein the vulcanized or crosslinked rubber in the base layer has a sieve particle size of from 1 to 6 mm, and the vulcanized or crosslinked rubber in the top layer has a sieve particle size of from 0.1 to 6 mm.

8. The multilayer synthetic sports surface of claim 6, wherein the multilayer synthetic sports surface has a thickness of at least 10 mm, the volume ratio of the base layer to the multilayer synthetic sports surface is from 40 to 95%, and the volume ratio of the top layer to the multilayer synthetic sports surface is from 5 to 60%.

9. The multilayer synthetic sports surface of claim 6, wherein the multilayer synthetic sports surface has a force reduction of from 35 to 50%, a vertical deformation of from 0.6 to 2.5 mm, a slide resistance value of at least 47 (BPN, 20° C.), a tensile strength of at least 0.4 MPa, an elongation at break of at least 40%, and a fire retardation grade of I, according to the GB/T 14833-2011 standard.

10. A method of preparing a multilayer synthetic sports surface from a first polymer mixture and a second polymer mixture as claimed in claim 1, comprising:
(1) providing the first polymer mixture, wherein the weight ratio of total acrylic emulsion (co)polymers to the vulcanized or crosslinked rubber is from 1:6 to 1:12;
(2) applying the first polymer mixture to a substrate;
(3) drying and curing the polymer mixture to form a base layer;
(4) providing the second polymer mixture, wherein the weight ratio of total acrylic emulsion (co)polymers to the vulcanized or crosslinked rubber is from 1:2 to 1:4;
(5) applying the second polymer mixture to the base layer; and
(6) drying and curing the second polymer mixture to form a top layer, such that the base layer resides between the substrate and the top layer.

\* \* \* \* \*